(12) United States Patent
Verhaeghe et al.

(10) Patent No.: US 9,943,036 B2
(45) Date of Patent: Apr. 17, 2018

(54) TAGGER FOR AGRICULTURAL BALER

(75) Inventors: Didier O. M. Verhaeghe, Ieper (BE); Jolan Heyns, Oostkamp (BE); Jonas Van Den Broucke, Lissewege (BE)

(73) Assignee: CNH Industrial America LLC, New Holland, PA (US)

( * ) Notice: Subject to any disclaimer, the term of this patent is extended or adjusted under 35 U.S.C. 154(b) by 1192 days.

(21) Appl. No.: 14/116,238

(22) PCT Filed: May 4, 2012

(86) PCT No.: PCT/EP2012/058209
§ 371 (c)(1),
(2), (4) Date: Feb. 10, 2014

(87) PCT Pub. No.: WO2012/152677
PCT Pub. Date: Nov. 15, 2012

(65) Prior Publication Data
US 2014/0157999 A1    Jun. 12, 2014

(30) Foreign Application Priority Data

May 9, 2011   (BE) .................................. 2011/0280

(51) Int. Cl.
*A01F 15/14* (2006.01)
*B65C 3/02* (2006.01)
*A01F 15/08* (2006.01)

(52) U.S. Cl.
CPC .............. *A01F 15/08* (2013.01); *A01F 15/14* (2013.01); *A01F 15/145* (2013.01); *B65C 3/02* (2013.01); *Y10T 156/10* (2015.01)

(58) Field of Classification Search
CPC ........ A01F 15/08; A01F 15/14; A01F 15/148; A01F 15/145; B65C 3/02; B65C 9/26; B65C 9/30; Y10T 156/10
See application file for complete search history.

(56) References Cited

U.S. PATENT DOCUMENTS

| 3,890,891 | A | * | 6/1975 | Floyd | A01F 15/08 100/102 |
|---|---|---|---|---|---|
| 4,286,513 | A | * | 9/1981 | Floyd | A01F 15/08 100/102 |
| 4,479,427 | A | * | 10/1984 | Floyd | A01F 15/08 100/102 |
| 7,703,391 | B2 | | 4/2010 | Duenwald et al. | |
| 7,717,149 | B2 | | 5/2010 | Johnson | |
| 7,878,557 | B2 | | 2/2011 | Eylenbosch et al. | |
| 2009/0056880 | A1 | * | 3/2009 | Johnson | B65C 3/02 156/537 |

FOREIGN PATENT DOCUMENTS

| AU | 664338 B2 | 11/1995 |
|---|---|---|
| DE | 102008047251 A1 | 3/2010 |
| EP | 0551558 A1 | 7/1993 |

* cited by examiner

*Primary Examiner* — Jimmy T Nguyen
(74) *Attorney, Agent, or Firm* — Patrick M. Sheldrake

(57) ABSTRACT

A tagger assembly has a tagger for affixing labels onto a lineal object binding a bale of agricultural crop material. The tagger having an input port for receiving the lineal object and an output port for evacuating the lineal object, and at least one retaining element for tensioning the lineal object, more particularly for tensioning the lineal object when it is raised from an initial position close to the bale to a raised position further away from the bale, for affixing a label.

12 Claims, 5 Drawing Sheets

TAGGER FOR AGRICULTURAL BALER

This application is the US National Stage filing of International Application Serial No. PCT/EP2012/058209 filed on May 4, 2012 which claims priority to Belgian Application BE2011/0280 filed May 9, 2011, each of which is incorporated herein by reference in its entirety.

FIELD OF THE INVENTION

The present invention relates to the field of processing and storing of agricultural crop material. More specifically, the invention relates to a method and a device for identification labeling of bales of agricultural crop material.

BACKGROUND OF THE INVENTION

An agricultural baler is a trailed machine, typically towed behind agricultural vehicles such as tractors, used in agriculture for the purpose of forming bales of agricultural crop materials, such as straw, hay, silage or other biomass, produced during a harvesting or mowing operation. A baler typically comprises an infeed through which biomass is introduced into a bale-forming chamber. In the bale-forming chamber the biomass is generally compressed or otherwise treated to form bales. The completed bales are tied with twine or a similar lineal object or are packaged in another way to make them self-supporting. The bales are subsequently ejected by means of a discharge mechanism. Integrated attachment of labels to completed bales is considered a useful baler feature, thus providing for example bale identification and/or a record of bale properties, such as composition, weight, density and/or moisture level.

U.S. Pat. No. 7,717,149 discloses a device to apply an adhesive label around a moving lineal object such as twine used for tying bales. This device automates the otherwise manual process of applying labels to bales, and can operate on a continuous flow basis while the bales are moving through an agricultural baler. However, the presence of loose debris inside the baler environment and slack in the twine may interfere with the mechanical operation of such labeling device.

SUMMARY OF THE INVENTION

It is an object of embodiments of the present invention to provide efficient means and methods for attaching labels to lineal objects used for packing bales of agricultural crop material.

The above objective is accomplished by a method and device according to the present invention.

In a first aspect, the present invention provides a tagger assembly comprising a tagger for affixing labels onto a lineal object binding a bale of agricultural crop material. The tagger comprises an input port for receiving the lineal object and an output port for evacuating the lineal object. The tagger assembly furthermore comprises at least one retaining element for tensioning the lineal object. By tensioning the lineal object, problems with the tagger due to slack on the lineal object are alleviated or even completely discarded.

In a tagger assembly according to embodiments of the present invention, the at least one retaining element may be located immediately before the input port and/or immediately behind the output port of the tagger. A retaining element before and behind the tagger help in forcing the lineal object to go in the tagger, rather than to get stuck somewhere around the tagger. The closer the retaining elements are placed to the tagger, the better the effect.

A tagger assembly according to embodiments of the present invention may comprise at least one lifting member for moving the lineal object between an initial position close to a bale of agricultural crop material and a raised position further away from the bale. The retaining element may be adapted for tensioning the lineal object while moving the lineal object from the initial position to the raised position.

In embodiments of the present invention, the at least one retaining element may be adapted for applying on the lineal object a braking force.

In accordance with embodiments of the present invention, at least one of the at least one retaining element may comprise a spring. In particular embodiments, at least one of the at least one retaining element may comprise a spring consisting of a strip bent in an arc. This embodiment is easy to implement. The strip bent in an arc applies an automatic spring force due to the bending. It is easy to clean, and, due to its shape, inherently prevents or reduces accumulation of debris.

A tagger assembly according to embodiments of the present invention may comprise a dispenser for dispensing labels and a pair of affixation elements between which a dispensed label is folded for attachment onto the lineal object. Such tagger assembly provides an easy way to automatically attach a label onto a lineal object.

In a second aspect, the present invention provides an agricultural baler comprising a knotter for binding a bale of agricultural crop material by means of a lineal object. The knotter is adapted for guiding the lineal object around the bale so as to form a closed loop encircling the bale of agricultural crop material. The agricultural baler furthermore comprises a tagger assembly according to any of the embodiments of the first aspect for affixing labels onto the lineal object. The at least one retaining element in the tagger assembly reduces slack on the lineal object when being raised. This is especially useful when the lineal object is to be moved between a pair of affixation elements such as brushes, where crop material and debris may be collected, thus obstructing easy transfer of the lineal object there between. If the at least one retaining element would not be present, it might happen that the lineal object is raised from its initial position close to the bale to a raised position, but, for example due to debris being present between the affixation elements, that the lineal object does not actually go between the affixation elements.

A baler according to embodiments of the present invention may further comprise a means for guiding the bale along a predetermined bale displacement direction, wherein at least one of the at least one retaining element is located such that all leverage points on the lineal object of the at least one lifting member are located in the bale displacement direction with respect to the leverage point on the lineal object of said retaining element. Alternatively or on top thereof, at least one of the at least one retaining element may be located such that the leverage point on the lineal object of said retaining element is located in the bale displacement direction with respect to all leverage points on the lineal object of the at least one lifting member.

In a baler according to embodiments of the present invention, the at least one retaining element may be adapted for applying a braking force.

A baler according to embodiments of the present invention may furthermore comprise a means for air flow generation, connected to an air flow guide with an air flow outlet, wherein the air flow outlet is oriented for exhausting air directed to the lineal object and/or to the at least one retaining element. Exhausting air directed to the lineal object and/or the at least one retaining element allows to remove debris before the lineal object reaches the tagger, thus further reducing possible obstruction problems.

In a third aspect, the present invention provides a method for labeling bales. The method comprises packing a bale of agricultural crop material by encircling the bale with a closed loop formed by a lineal object, pulling the lineal object from an initial position close to the bale to a raised position further away from the bale, tensioning the lineal object in the raised position by applying onto the lineal object a force toward the bale, dispensing a label, and returning the lineal object to the initial position close to the bale while firmly affixing the label onto the lineal object.

In a method according to embodiments of the present invention, packing a bale may comprise knotting the lineal object encircling the bale with a closed loop, for example either by means of a single knotter or by means of a double knotter. Tensioning the lineal object in the raised position may then be performed after knotting the lineal object.

A method according to embodiments of the present invention may furthermore comprise the step of applying a flow of air towards the lineal object and/or towards a retaining element for tensioning the lineal object in the raised position.

It is an advantage of embodiments of the present invention that simple and reliable devices and methods are provided that maintain taut a lineal object used for packing bales while attaching a label to said lineal object.

It is an advantage of embodiments of the present invention that the influence of mechanical resistance in components of the tagger caused by crop material debris on labeling efficiency is reduced.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
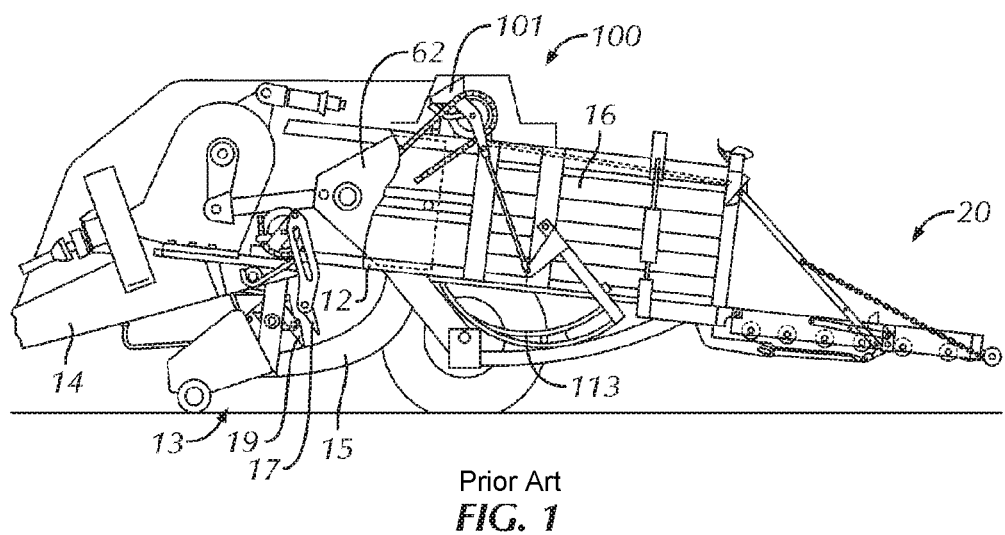
FIG. 1 is a schematic, vertically sectioned view of a typical rectangular baler.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Figure 2:
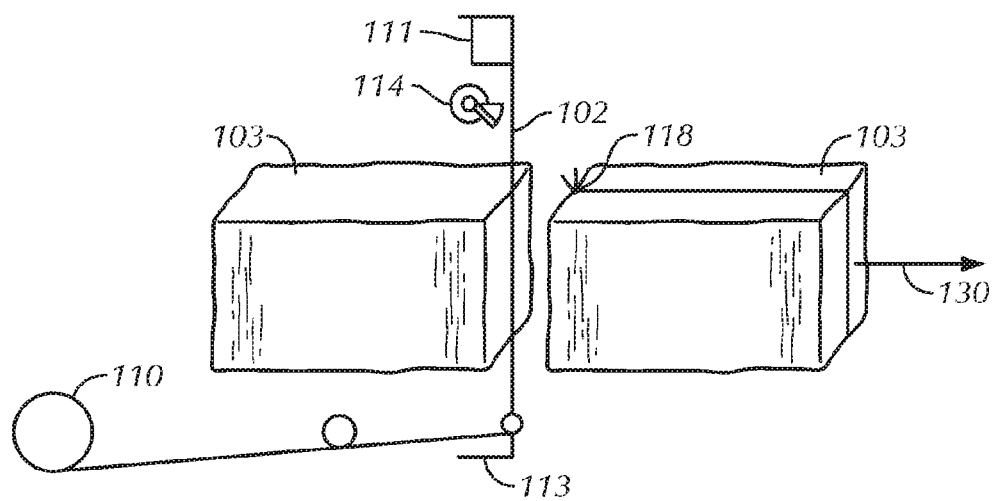
FIG. 2 schematically illustrates a first bale being bound by means of a lineal object, and a second bale to be bound by a lineal object, by means of a single knotter.
Figure 3:
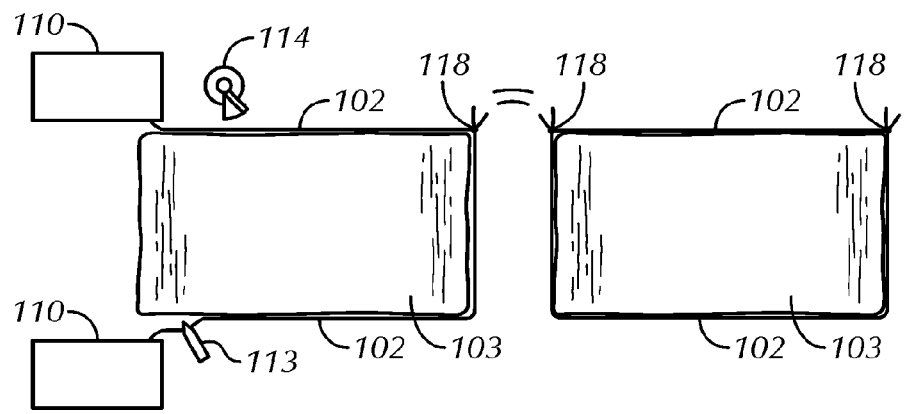
FIG. 3 schematically illustrates a first bale being bound by means of a lineal object, and a second bale to be bound by a lineal object, by means of a double knotter.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to knotters, reference is made to any tying devices adapted for baling processes, i.e. for the use in agricultural balers. These include, but are not limited to, devices for knotting, twisting, stapling or crimping of any suitable lineal object, such as e.g. wire, twine or banding, for the purpose of packing a bale of crop material with said lineal object. Different types of knotters exist, such as for example single knotters or double knotters. A single knotter, as illustrated in FIG. 2, is adapted for making a single knot in each loop of lineal object encircling a bale. The lineal object is pulled between the tightly abutting ends of a previous bale and the one being formed in order to progressively lengthen the material in the loop until the forming bale reaches its predetermined size, at which point the opposite ends of the loop are simply tied together and the bale is thereby securely bound. The need to pull the lineal object between the abutting bales in this manner arises because each lineal object has one end thereof retained by the tying mechanism while the rest of the lineal object is draped across the baling chamber. As the growing bale is pushed through the chamber, it presses against the lineal object draped across the bale chamber and, because one end is anchored at a lineal object holder, the lineal object must be pulled between the bales by the hook mechanism in order to increase the length of the lineal object along that side of the bale adjacent the hook mechanism. A double knotter, as illustrated in FIG. 3, is adapted for making two knots in each loop. Two runs of lineal object drawn from two supply rolls are knotted at the commencement of formation of a bale. As the size of the bale increases, more lineal object is drawn from the supply rolls but neither run of the lineal object needs to slide over the surface of the bale. At the end of the bale forming cycle, two knots are formed in the two lineal objects, the first to tie the completed bale, and the next to commence the next bale. A particular embodiment of a knotter is described in EP2108247.

Where in embodiments of the present invention reference is made to agricultural balers, reference is made to machines for forming bales from agricultural crop material, such as forming rectangular bales by any suitable means, e.g. plungers, or forming cylindrical bales, e.g. by winding and pressing.

Where in embodiments of the present invention reference is made to crop material, reference is made to any suitable type of biomass that can be harvested and packed in bales, such as for example hay, silage, straw or other.

In a first aspect, the present invention relates to a tagger assembly of an agricultural baler. Embodiments of the present invention can be used for applying a label, for example an adhesive label, such as e.g. a radiofrequency identification (RFID) tag with adhesive back coating, around a moving lineal object, for example wire, cord, ribbon, rope, banding or twine, used for packing a bale of agricultural crop material, such as hay, straw, silage, cotton or other biomass. It is an advantage of a tagger assembly according to embodiments of the present invention that it can apply tags, e.g. RFID tags, on a lineal object binding a bale, which tags can comprise information about the bale being tagged. Such information can e.g. comprise bale density information, moisture content of the bale, length of the bale, etc.

Referring to the drawings, FIG. 1 shows a prior art agricultural baler 100 comprising a frame 12 which is equipped with a forwardly extending tongue 14 at its front end with hitch means (not shown) for coupling the baler 100 to a towing tractor. A pick-up assembly 13 lifts windrowed crop material off the field as the baler 100 is traveled thereover and delivers such material into the front end of a rearwardly and upwardly curved, charge-forming feeder duct 15. The duct 15 communicates at its upper end with an overhead, fore-and-aft extending bale-forming chamber 16 into which crop charges are loaded by a cyclically operating stuffer mechanism 17. A continuously operating packer mechanism 19 at the lower front end of the feeder duct 15 continuously feeds and packs material into the duct 15 as to cause charges of the crop material to take on and assume the internal configuration of the duct 15 prior to periodic engagement by the stuffer 17 and insertion up into the bale-forming chamber 16. The feeder duct 15 may be equipped with means (not illustrated) for establishing whether a complete charge has been formed therein and operating the stuffer mechanism 17 in response thereto. Each action of the stuffer mechanism 17 introduces a "charge" or "flake" of crop material from the duct 15 into the chamber 16.

A plunger 62 reciprocates in a fore-and-aft direction within the bale-forming chamber 16. Biomass fed via the feeder duct 15 is thereby compacted, e.g. compressed or otherwise treated, so as to form bales in the above-described operation of the agricultural baler 100. Rectangular bales are formed. The completed bales are tied with twine or a similar lineal object to make them self-supporting, for example for shipping and storage. Once tied, the bales are discharged from the rear end of the bale-forming chamber 16 onto a discharge in the form of a chute, generally designated 20.

Figure 4:
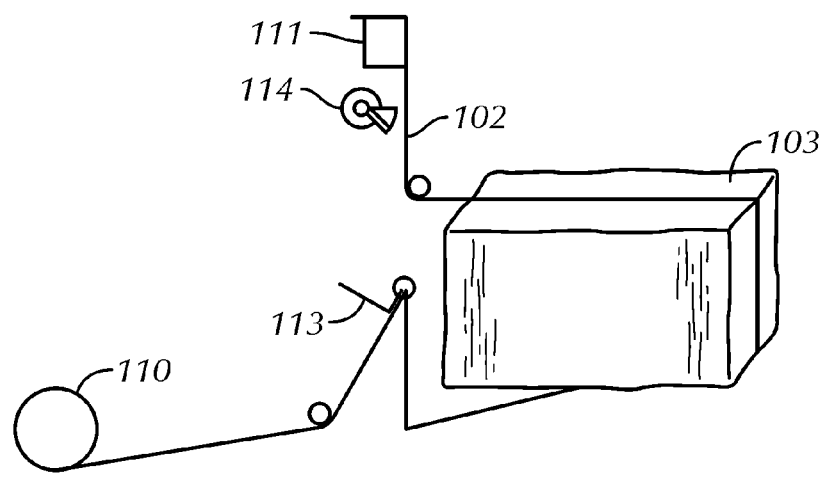
FIG. 4 schematically illustrates a bale in the process of being encircled by a lineal object.

For tying the bales, at least one knotter 101 for automatically tying the bales of crop material, illustrated in more detail in FIG. 2, FIG. 3 and FIG. 4, is provided on the baler 100 for each guiding a lineal object 102 around a bale 103 and forming a closed loop in the lineal object 102 encircling the bale 103, for example by tying, stapling or crimping. In accordance with embodiments of the present invention (not illustrated in the drawings), a knotter system may be provided, comprising a plurality of knotters 101 which operate substantially simultaneously, such that a bale 103 is tied with a plurality of lineal objects 102. For illustration purposes only, two bales 103, one already packed and one being packed, are illustrated in FIG. 2 with a spacing there between. In reality, both bales 103 will push one against the other, so the spacing will not be present. The lineal object 102 is pulled between both bales 103.

A knotter 101 can be implemented as known in the art, and may for example comprise at least one source of lineal object 102, e.g. at least one twine supply roll 110, a lineal object holder 111 for holding one end of the lineal object 102, a cutter 114 for cutting the lineal object 102 and a hook mechanism 113, for example implemented as a reciprocating inserter arm, also called needle, for bringing another piece, e.g. end, of the lineal object 102 towards the end held by the lineal object holder 111, for securing the lineal object 102 to itself so as to make a loop. As illustrated in FIG. 1, the needle 113 is mounted on the baler frame 12 and may be swung back and forth across the bale-forming chamber 16 when activated. The needle 113 has an "at-home" or rest position fully below the bale-forming chamber 16 and a "full-throw" position extended completely across the bale-forming chamber 16. The tip of the needle 113 may have an eyelet defined therein for holding the lineal object 102.

The knotter system illustrated as an illustrative embodiment in FIG. 2 and FIG. 4 has a single lineal object, e.g. twine supply roll 110 at the bottom side of the system. In alternative implementations, in case of a single knotter, such supply roll 110 may be provided at the top side of the system. In alternative embodiments, for example in case of a double knotter as illustrated in FIG. 3, supply rolls 110 may be provided both at the top and at the bottom side of the system.

In the example illustrated in FIG. 2, the lineal object, e.g. twine, holder 111 retains one end of lineal object, e.g. a strand of twine, and the hook mechanism 113 pulls this strand between the abutting ends of a previous bale and the one which is to be packed. As the bale 103 being packed is pushed along a bale displacement direction 130, for example through a bale-forming chamber 16 of the baler 100 or along a discharge at the outlet end of such chamber 16, it pushes against the strand of twine held between the lineal object holder 111 and the hook mechanism 113, causing the lineal object 102 to elongate, for example by unrolling from the supply roll 110, as illustrated in FIG. 4.

When the end of the bale 103 being packed is reached, as illustrated in FIG. 4, the hook mechanism 113 pulls the strand back toward the lineal object holder 111 along the abutting end of the bale 103, for example by swinging the needle 113 through the bale-forming chamber 116. The needle 113 takes the lineal object 102 with it towards either the other end of the lineal object 102 (single knotter), or towards another piece of lineal object 102 (double knotter). One knot 118 (single knotter) or two subsequent knots 118 (double knotter) may be made e.g. with a knotting mechanism tying both ends of the strand together, after which the lineal object 102 may be cut by means of a cutter 114, either behind the single knot 118, or in between the two knots 118.

The knotter 101 illustrated in FIG. 2 and FIG. 3 is a knotter involving a single loop of lineal object 102. Also more complex knotter configurations are known in the art, involving for example multiple strands of lineal object adjacent one another, or banding material being crimped instead of twine.

Figure 5:
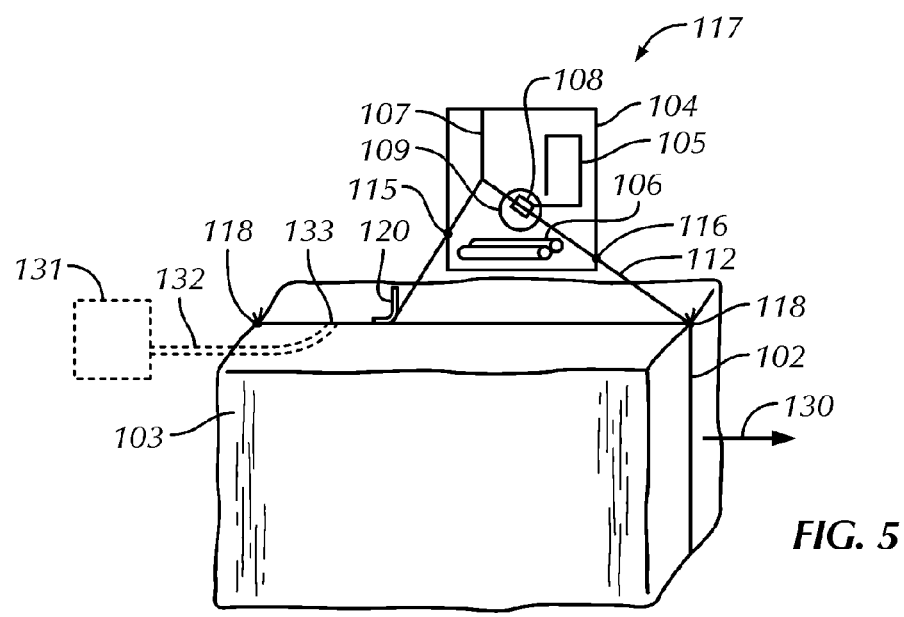
FIG. 5 schematically illustrates part of a baler comprising a tagger and a retaining element according to embodiments of the present invention, a bale being partially encircled by a lineal object.

In embodiments of the present invention, illustrated in FIG. 5, a tagger assembly 117 is provided, for providing a label 108, for example a label with adhesive back coating, around the lineal object 102 as the lineal object moves under and through a tagger 104. A tagger assembly 117 according to embodiments of the present invention comprises a tagger 104 and a retaining element 120. The tagger 104 according to embodiments of the present invention comprises a dispenser 105 for dispensing labels 108, and a pair of affixation elements 106 for attaching the labels 108 to the lineal object 102 and at least one lifting member 107 for gripping and lifting the lineal object 102 for attachment of the label 108. This tagger 104 may for example be such a device as disclosed in U.S. Pat. No. 7,717,149. The tagger 104 comprises an input port 115 for receiving the lineal object 102, and an output port 116 for evacuating the lineal object 102 from the tagger 104. The at least one lifting member 107, for example one or more lifting hooks, e.g. a pair of lifting hooks disposed on both sides of the pair of affixation elements 106 in bale displacement direction 130, lifts the lineal object 102 within the tagger 104 from an initial position close to the bale 103, for example below the pair of affixation elements 106, where the lineal object 102 may be supported by the bale 103, to a raised position 112 further away from the bale 103, for example above the affixation elements 106 and adjacent to the dispenser 105, i.e. such that the lineal object 102 in the raised position is close enough to a label 108 dispensed by the dispenser 105 to allow attachment of the label 108 to the lineal object 102 by the affixation elements 106.

In use, the dispenser 105 supplies labels 108 at a dispensation site 109, for example above the affixation elements 106 and below the lineal object 102 in its raised position 112. Said dispenser 105 may for example comprise a supply roll carrying a series of tags temporarily adhered to a continuous roll with coated backing, a take-up roll that is mechanically driven to pull the backing with adhered labels from the supply roll, a guide roll to bend the backing under an acute angle to induce detachment of the labels 108 from the backing, such detachment for example caused by a greater stiffness of the labels 108 compared to the backing, and optionally a guiding member to guide the detached labels 108 to the dispensation site 109 between the lineal object 102 in its raised position 112 and the affixation elements 106. When a label 108 is supplied at the dispensation site 109, for example into the space between the lineal object 102 in its raised position 112 and the affixation elements 106, the at least one lifting member 107 guides or releases the lineal object 102 substantially back to the initial position, e.g. back to the initial position, for example along a path causing the lineal object 102 to pull the label 108 in between and through the pair of affixation elements 106. The affixation elements 106, comprising for example a pair of rollers or a pair of brushes, may be configured for exerting a compressive force on objects passing in between the affixation elements 106, thereby causing an adhesive label 108 to adhere to itself around the lineal object 102.

In embodiments of the present invention, at least one retaining element 120 is provided to keep the lineal object 102 taut while being raised by the at least one lifting member 107. This may ensure efficient movement of the lineal object 102 to the raised position 112 and sufficient tension in the lineal object 102 to exert an adequate force, for example to pull the label 108 through the pair of affixation elements 106, when released or guided back to the initial position. Without such retaining element 120, the slack of the lineal object 102 caused by the bale 103 being compressed in the bale-forming chamber 16, and possible additional resistance between the affixation elements 106 for example caused by loose debris present in the baler environment, may impair efficient operation of the tagger 104. In accordance with embodiments of the present invention, the at least one retaining element 120 for tensioning the lineal object 102 is located immediately before the input port 115 or immediately behind the output port 116 of the tagger 104. With "immediately before" and "immediately behind" is meant that no other structural elements for guiding, retaining nor tensioning the lineal object 102 are provided between the input port 115, resp. output port 116, and the at least one retaining element 120. No structural elements for guiding, retaining or tensioning the lineal object 102 are provided between the at least one retaining element 120 an the lifting member 107.

In embodiments of the present invention, the baler 100 may comprise a means for guiding the bale 103 along a predetermined bale displacement direction 130, for example the plunger 62 pushing forward the bale 103 being formed, wherein the at least one retaining element 120 may be located such that all leverage points on the lineal object 102 of the at least one lifting member 107 are located in the bale displacement direction from the leverage point of said at least one retaining element 120 on the lineal object 102. This configuration is illustrated in FIG. 5.

In embodiments of the present invention, the baler 100 may comprise a means for guiding the bale 103 along a predetermined bale displacement direction 130, for example the plunger 62 pushing forward the bale 103 being formed, wherein at least one retaining element 120 may be located such that the leverage point on the lineal object 102 of said at least one retaining element 120 is located in the bale displacement direction compared to all leverage points on the lineal object of the at least one lifting member 107. This configuration is not illustrated in the drawings.

Figure 6:
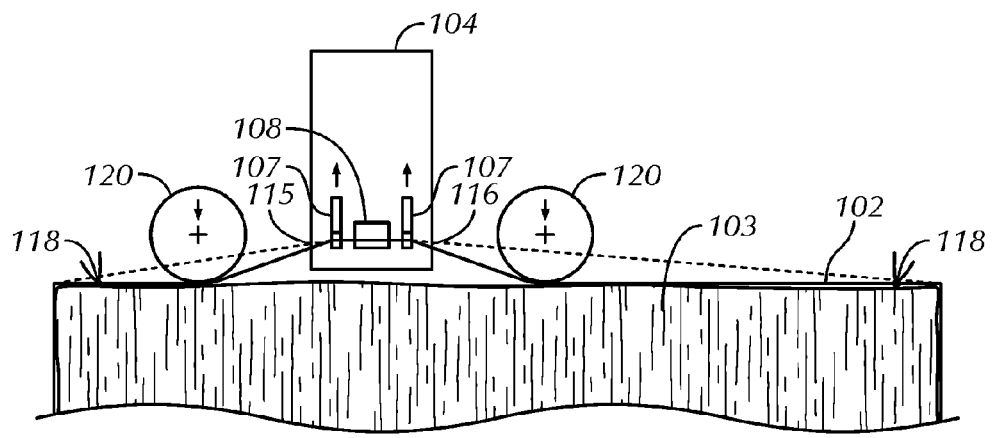
FIG. 6 shows a tagger and two retaining elements according to embodiments of the present invention, the retaining elements comprising rollers for holding the lineal object against the bale.

In embodiments of the present invention, one or more retaining elements 120 may be located, referring to the bale displacement direction, before the leverage point(s) on the lineal object 102 of the at least one lifting member 107 and one or more retaining elements 120 may be located after the leverage point(s) on the lineal object 102 of the at least one lifting member 107. This configuration is illustrated in FIG. 6, which illustrates an embodiment with two lifting members 107, one at either side of the tagger 104, and one retaining element 120 before and another retaining element 120 after the leverage points on the lineal object 102 of the two lifting members 107.

Optionally, in embodiments not illustrated in the drawings, also between leverage points on the lineal object 102 of a plurality of lifting members 107 one or more retaining elements 120 can be provided.

The one or more retaining elements 120 of a tagger assembly 117 according to embodiments of the present invention are adapted for, during use, holding the lineal object 102 against the bale 103, and optionally applying a braking force onto the lineal object 102. If the at least one retaining element 120 according to embodiments of the present invention would not be present, the lineal object 102 could be raised over a larger distance seen in length direction of the bale 103, as illustrated by the dotted lines in FIG. 6. Due to the presence of the at least one retaining element 120, the distance in length direction of the bale 103 over which the lineal object 102 can be raised is decreased, thus increasing the chance that the lineal object is effectively raised past the affixation elements 106 of the tagger 104, so as to provide proper functioning of the tagger 104.

It is an advantage of a tagger assembly 117 according to embodiments of the present invention that it does not influence the functioning of the knotter device 101. In particular the retaining element 120 which is added to the tagger assembly 117 in accordance with embodiments of the present invention does not exert, during the knotting process, a force on the lineal object 102 which would influence the knotting process. The tagging process takes place after the bale 103 has been bound and knotted.

Figure 7:
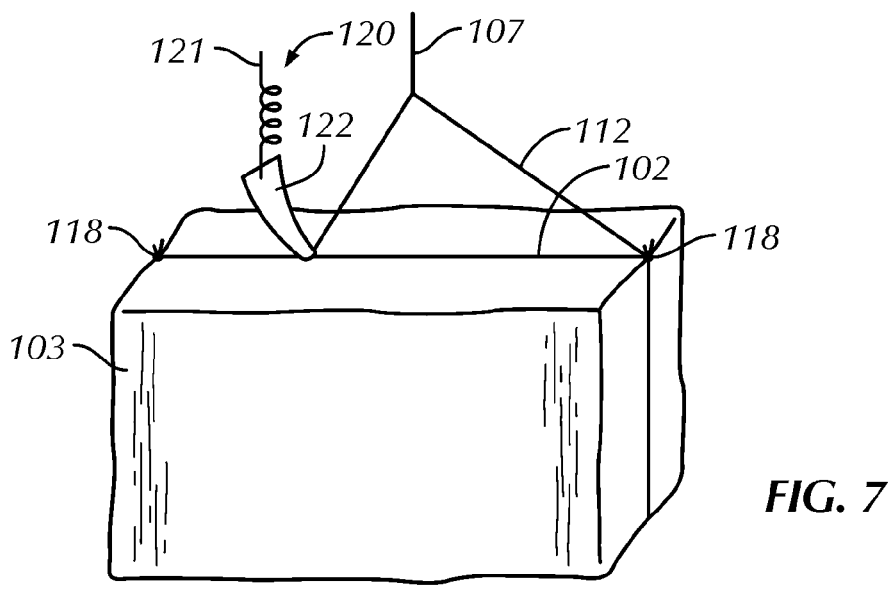
FIG. 7 shows a retaining element according to embodiments of the present invention, comprising a plate attached to a compression coil spring.

In embodiments of present invention the retaining element 120 may comprise or consist of a spring 121, for example a compression spring such as a compression coil spring, configured in such way as to exert a force on the lineal object 102, e.g. a compressive force, for example oriented normally to the surface that supports the lineal object 102 binding the bale 103. A small plate 122 may for example be attached to a compression spring 121, as illustrated in FIG. 7, at the side of the spring 121 exerting a force on the lineal object 102, allowing unobstructed slipping of the lineal object 102 underneath the plate 122, while resisting movement of the lineal object 102 in the direction normal to the surface of the bale 103 that supports the lineal object 102. Alternatively, not illustrated in the drawings, the retaining element 120 could for example comprise a retaining arm biased by a spring force for taking up slack in the lineal object 102 and a clamp for gripping the lineal object 102. The clamp can for example comprise one or more guides adapted for threading there through the lineal object 102.

Figure 8:
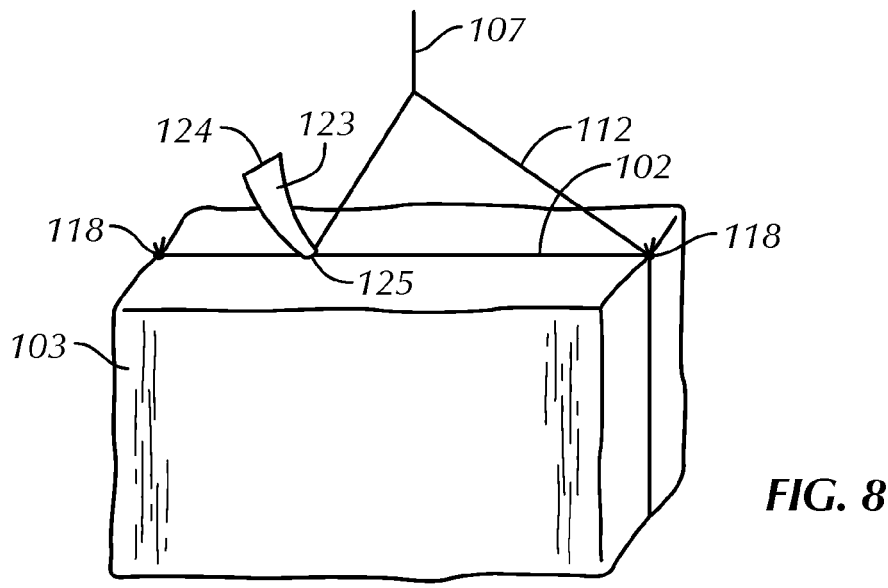
FIG. 8 shows a retaining element according to alternative embodiments of the present invention, the retaining element comprising a resilient plate, e.g. bent in an arc.

In alternative embodiments of present invention, as illustrated in FIG. 8, the retaining element 120 may comprise or consist of another type of spring element than a coil spring, the spring element for example comprising or consisting of a strip 123 bent in an arc, the strip 123 e.g. being formed by a flexible plate of suitable material such as e.g. metal or plastics material. Such a strip 123 may be secured at one end 124 while allowing a bale 103 to slide underneath the other end 125 when it is pushed along a predetermined path, e.g. the bale displacement direction 130. The curved shape of the strip 123 allows unobstructed passage of the bale 103 while providing tension to the lineal object 102 when the lineal object 102 is raised by the at least one lifting member 107. The curved shape of such strip 123 allows relaxation of the spring element when the loose end 125 is no longer supported by a bale 103, and reloading of the spring when a next bale 103 pushes against the strip 123. The retaining element 120 thus exerts the function of a spring, due to its configuration and/or material, without it being actually provided with a spring.

Figure 9:
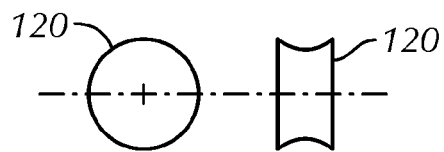
FIG. 9 illustrates an embodiment of a retaining element, as may for example be used in the embodiments illustrated in FIG. 6.

In particular embodiments of the present invention, the one or more retaining elements 120 could for example be rolls, as illustrated in FIG. 6. These rolls can have a cylindrical shape, but in order to better perform their retaining function, they may be provided with a groove for guiding the lineal object 102, or they may have a hollow cylindrical shape, as for example illustrated in FIG. 9.

In embodiments of the present invention, the baler 100 may furthermore comprise a means for air flow generation 131, for example a flywheel with fans or a canister of compressed air, an air flow guide 132, like for example a flexible plastic tubing, and an air flow outlet 133, wherein the air flow outlet is oriented for exhausting air directed to the lineal object 102 and/or the at least one retaining element 120. Such means for air flow generation are only illustrated in the embodiment of FIG. 5, but it will be clear for a person skilled in the art that such means for air flow generation can also be provided with other embodiments of the present invention. Such embodiments comprising means of air flow generation may alleviate the accumulation of debris, and therefore, in combination with a retaining element 120 according to embodiments of the present invention, may prevent functional impairment of the tagger assembly 117 by said debris. In particular embodiments of the present invention, the generated air flow can be continuous. In more advantageous embodiments, the generated air flow can be pulsating. As an example only, the pulsating air flow can be such that an air pulse is generated at regular time intervals, e.g. every 30 seconds. A pulsating air flow yields better results than a continuous air flow because of the variation in the air pattern it creates. Whirls are generated by a pulsating air flow, thus alleviating or possibly even avoiding dead spaces where air remains stationary. In particular embodiments of the present invention, the air flow guide 132 and air flow outlet may be adapted for orienting the air flow in a direction substantially perpendicular to the lineal object 102, along the surface of the bale 103 and just before the tensioning element 120.

Figure 10:
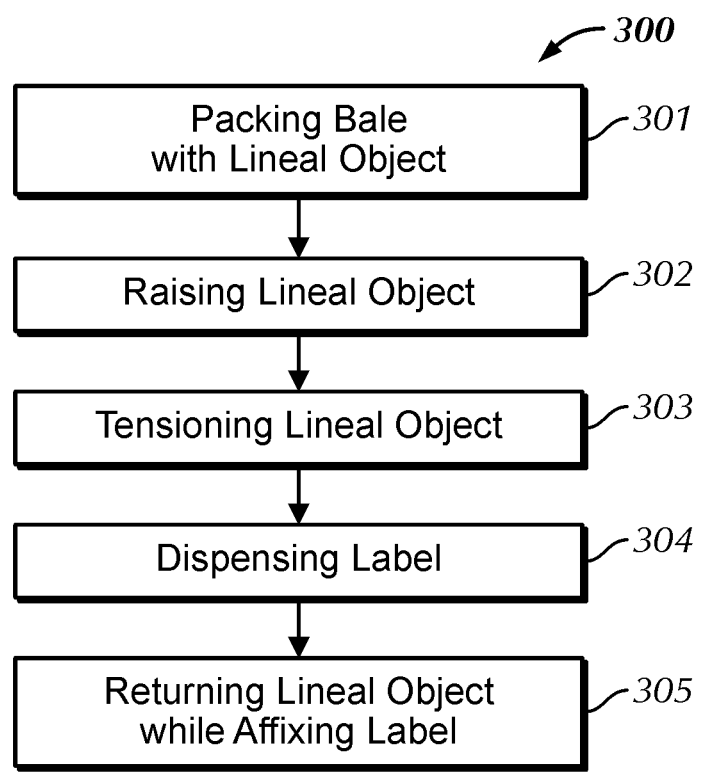
FIG. 10 is a flow diagram of a method for labeling bales according to embodiments of the present invention.

In a second aspect of the present invention, illustrated in FIG. 10, a method 300 for labeling bales 103 of agricultural crop material is provided. Said method comprises the steps of packing 301 a bale 103 of agricultural crop material by encircling the bale 103 with a closed loop formed by a lineal object 102, e.g. by entwining the bale with twine using a (single or double) knotter device 101, pulling 302 the lineal object 102 from an initial position close to the bale 103 to a raised position 112 further away from the bale 103, for example by raising the lineal object 102 using at least one lifting member 107, tensioning 303 the lineal object 102 in the raised position, e.g. by pushing the lineal object 102 against the bale 103 using at least one retaining element 120 such as a spring element, e.g. comprising or consisting of a compression coil 121, a flexible strip 123 bent in an arc or a roller, dispensing 304 a label 108, e.g. by using the label dispenser 105, and returning 305 the lineal object 102 to the initial position close to the bale 103 while firmly affixing the label 108 onto the lineal object 102 by applying pressure to the label with the affixation elements 106.

Methods according to embodiments of present invention may furthermore comprise the step of applying a flow of air in the direction of the lineal object 102 and/or the retaining element 120 for tensioning the lineal object 102 in the raised position. Such a flow of air can for example be applied using a means for air flow generation 131, such as a canister of compressed air, connected to an air flow guide 132, such as plastic tubing, with an air flow outlet 133.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

The invention claimed is:

1. A tagger assembly comprising:
   a tagger for affixing labels onto a lineal object binding a bale of agricultural crop material, the tagger comprising an input port for receiving the lineal object and an output port for evacuating the lineal object;
   at least one lifting element for moving the lineal object between an initial position close to the bale and a raised tagging position further from the bale; and
   at least one retaining element for tensioning the lineal object by applying an opposing force during movement of the lineal object to the raised tagging position, wherein the at least one retaining element is spaced from the at least one lifting element.

2. The tagger assembly according to claim 1, wherein the at least one retaining element is located at at least one of immediately before the input port and immediately behind the output port of the tagger.

3. A tagger assembly comprising:
   a tagger for affixing labels onto a lineal object binding a bale of agricultural crop material, the tagger comprising an input port for receiving the lineal object and an output port for evacuating the lineal object;
   at least one lifting element for moving the lineal object between an initial position close to the bale and a raised tagging position further from the bale; and
   at least one retaining element for tensioning the lineal object by applying an opposing force during movement of the lineal object to the raised tagging position, wherein the at least one retaining element is spaced from the at least one lifting element, and wherein the at least one retaining element comprises a spring.

4. The tagger assembly according to claim 3, wherein the spring comprises a strip bent in an arc.

5. The tagger assembly according to claim 1, further comprising a dispenser for dispensing labels and a pair of affixation elements between which a dispensed label is folded for attachment onto the lineal object.

6. An agricultural baler comprising:
   a knotter system for binding a bale of agricultural crop material with a lineal object; and
   a tagger for affixing labels onto the lineal object, the tagger comprising an input port for receiving the lineal object and an output port for evacuating the lineal object and at least one lifting element configured for moving the lineal object to a raised tagging position; and
   at least one retaining element configured to apply an opposing force to the lineal object for tensioning the lineal object during movement of the lineal object to the raised tagging position, wherein the at least one retaining element is spaced from the at least one lifting element.

7. The baler according to claim 6, comprising a guide for directing the bale along a predetermined bale displacement direction, wherein the at least one retaining element is located such that all leverage points on the lineal object of the at least one lifting member are located in the bale displacement direction with respect to the leverage point on the lineal object of said retaining element.

8. The baler according to claim 6, comprising a guide for directing the bale along a predetermined bale displacement direction, wherein the at least one retaining element is located such that a leverage point on the lineal object of said retaining element is located in the bale displacement direction with respect to all leverage points on the lineal object of the at least one lifting member.

9. An agricultural baler comprising:
a knotter system for binding a bale of agricultural crop material with a lineal object; and
a tagger for affixing labels onto the lineal object, the tagger comprising an input port for receiving the lineal object and an output port for evacuating the lineal object, and at least one lifting element configured for moving the lineal object to a raised tagging position;
at least one retaining element for tensioning the lineal object;
a guide for directing the bale along a predetermined bale displacement direction, wherein the at least one retaining element is located such that a leverage point on the lineal object of said retaining element is located in the bale displacement direction with respect to all leverage points on the lineal object of the at least one lifting member; and
an air flow generator, connected to an air flow guide with an air flow outlet, wherein the air flow outlet is oriented for exhausting air directed to at least one of the lineal object and the at least one retaining element.

10. A method for labeling bales, comprising:
packing a bale of agricultural crop material by encircling the bale with a closed loop formed by a lineal object,
pulling the lineal object from an initial position close to the bale to a raised position further away from the bale,
tensioning the lineal object in the raised position by applying onto the lineal object a force toward the bale,
dispensing a label, and
returning the lineal object to the initial position while firmly affixing the label onto the lineal object.

11. The method according to claim 10, wherein packing a bale comprises knotting the lineal object encircling the bale with a closed loop, wherein tensioning the lineal object in the raised position is performed after knotting the lineal object.

12. The method according to claim 10, further comprising the step of applying a flow of air towards at least one of the lineal object and a retaining element for tensioning the lineal object in the raised position.

\* \* \* \* \*